March 10, 1959     E. R. ROBBINS     2,877,410
WAVEGUIDE SYSTEM AND METHOD
Filed March 20, 1956     2 Sheets-Sheet 1

INVENTOR:
EARL R. ROBBINS,
BY *Michael Masnik*
HIS AGENT.

INVENTOR:
EARL R. ROBBINS,
BY Michael Masnik
HIS AGENT.

United States Patent Office 2,877,410
Patented Mar. 10, 1959

2,877,410

WAVEGUIDE SYSTEM AND METHOD

Earl R. Robbins, Baldwinsville, N. Y., assignor to General Electric Company, a corporation of New York Application March 20, 1956, Serial No. 572,769

4 Claims. (Cl. 324—58.5)

This invention relates primarily to wave transmission method and means, particularly to method and means for controlling electromagnetic waves.

In the electrical and the electronics industry, there exists a need for high-powered electrical wave transmission lines and waveguide components to serve as variable attenuators, variable loads and wave modulators.

Prior arrangement for satisfying these needs have been found to be limited in their application because of mechanical shortcomings, relatively low power handling capabilities, instability, and undesirable dependence upon environmental conditions. An arrangement or scheme which would overcome these shortcomings, as well as provide a more flexible and more easily controllable wave controlling effect, is highly desirable.

It is, therefore, an object of my invention to provide an improved wave controlling system and method.

Another object of my invention is to provide a desired wave attenuating system and method.

Another object of my invention is to provide an improved variable attenuator for use with wave propagating media.

Another object of my invention is to provide an improved method and means for lobing electromagnetic radiation patterns.

Another object of my invention is to provide an improved arrangement and method for measuring wave properties at high frequencies.

Another object of my invention is to provide an improved method and means for measurement of radio waves.

Another object of my invention is to provide an improved method and means for measuring the permeability of materials at high radio frequencies.

In accordance with one embodiment of applicant's invention an improved method and means is provided for attenuating electromagnetic waves. The method and means employs placing a series of plates, formed of material having a permeability greater than one, in a wave transmission line or waveguide in such a manner that the plates are substantially perpendicular to the dominant or fundamental lines of the electric field. The plates in the waveguide are exposed to an external magnetic field whose intensity is modulated in a desired manner to control the attenuation of electromagnetic waves being propagated between such plates.

The novel features, which I believe to be characteristic of my invention, are set forth with particularity in the appended claims. My invention, itself, however, both as to its organization and method of operation, together with further objects and advantages thereof, may best be understood by reference to the following description taken in connection with the accompanying drawings in which:

Fig. 6b is a graph useful in explaining the operation of the arrangement of Fig. 6a.

Figure 1:
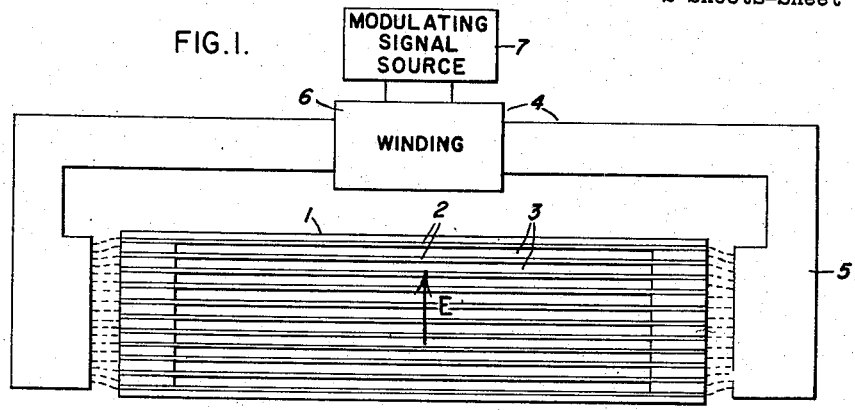
Fig. 1 is a diagram in cross-sectional form of one embodiment of the invention operating as an electromagnetic wave attenuator or a radio frequency wave modulator.

Referring to Fig. 1 there is shown, in cross-sectional form, a waveguide attenuator 1 constructed in accordance with the teachings set forth in the copending application of Earl R. Robbins and Burton P. Brown filed on March 24, 1955, Serial Number 496,381, entitled Waveguide System and assigned to the same assignee.

Briefly, in this copending application it is shown that for a given frequency, waves being propagated through a waveguide may be attenuated depending upon the height of the guide. Thus it is possible by controlling the height of the waveguide to change its attenuation properties.

Referring to Fig. 1, this attenuation is achieved by propagating the waves in separate portions between parallel spaced plates 2 which are positioned within the waveguide perpendicular to the electric field E established by the waves of the dominant mode being propagated down the guide. The degree of perpendicularity and the thickness of the plates determine the amount of reflection from the plates and the attenuation of the propagated waves. The methods for compensating or minimizing the undesirable wave reflections are further described in the copending application. It suffices to say, for the purposes of this application, that each of the narrow waveguide portions 3 operate to incrementally attenuate the amount of wave energy being propagated therethrough. By making the conductive plates sufficiently thin, the need for impedance matching is substantially eliminated. Applicant has found that by exposing the portion of the waveguide containing the plates to a magnetic field the attenuation through this portion can be controlled. In the embodiment disclosed in Fig. 1, the magnetic field is obtained by means of an electromagnet 4 comprising a core 5 and a magnetic field winding 6. By controlling the current flowing through the winding 6, as by means of modulating signals derived from the source 7, the strength of the magnetic field established through the waveguide portion comprising the parallel plates may be varied.

Thus, it is seen that depending upon the type of signal available from the source 7, the attenuation of the electromagnetic waves being propagated through the section of guide containing the parallel plates may be controlled. The modulating signal available from source 7 may be alternating, pulsed, direct or any desirable form to effect a desired attenuation of waves propagated through the waveguide section.

Figure 2:
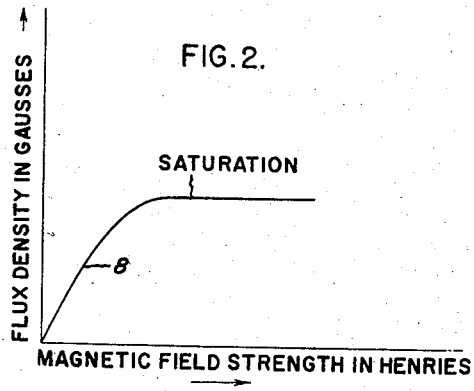
Fig. 2 illustrates graphically the manner in which the flux density of the magnetic circuit of Fig. 1 varies with the applied magnetic field strength.

The manner in which the attenuation is obtained can perhaps best be illustrated by reference to the graph of Fig. 2. Applicant has determined that the attenuation of waves being propagated through the section of guides containing parallel plates is determined by the following equation:

$$\alpha_c \text{ (attenuation)} = \frac{R_s}{bn_1\sqrt{1-\left(\frac{f_c}{f}\right)^2}}\left[1+\frac{2b}{a}\left(\frac{f_c}{f}\right)^2\right] \frac{\text{nepers}}{\text{meter}}$$

$\alpha_c$—attenuation due to conduction losses in $\frac{\text{nepers}}{\text{meter}}$ $R_s$—surface resistance in ohms $n_1$—intrinsic impedance in ohms $a$—waveguide width in meters $b$—waveguide height in meters $f_c$—waveguide cutoff frequency in cycles per second $f$—desired frequency for attenuation in cycles per seconds where:

$$R_s = \frac{1}{\delta\sigma} = \sqrt{\rho\pi f\mu}$$

$\sigma$—conductivity in mhos/meter
$\delta$—skin depth in meters
$f$—frequency in cycles per second
$\mu$—magnetic permeability in gausses
$\rho$—resistivity in ohms A study of this equation indicates that if the permeability, $\mu$, of the parallel plates 2 of Fig. 1 is changed, the attenuation of waves being propagated therethrough is also altered. The manner in which the permeability of the parallel plates varies with magnetic field strength may be best explained by reference to Fig. 2, wherein the field strength of the magnetic field established through the section of waveguide containing the parallel plates is plotted as abscissa, and the resulting flux density is plotted as the ordinate. The slope of the curve of Fig. 2 determines the permeability of the material involved. It is seen that the permeability at saturation is one, and that this gradually increases as we move away from saturation. By varying the flux density in the parallel plates from a small value to saturation, an effective off-on operation of wave transmission is obtained. By appropriately biasing the electromagnet 4, the magnetic material of the parallel plates 2 may be operated in a linear region of its characteristic curve as shown at 8. Thus, it would be possible by establishing a suitable bias in electromagnet 4 to permit operation in this linear region and then superimpose a modulating signal, such as a voice or synchronizing signal, substantially linear modulation of the electromagnetic waves being propagated through the waveguide may be achieved. It should be noted that the direction of the magnetic field is substantially arbitrary and may be varied for operational reasons. However, by operating in the manner shown in Fig. 1, an optimum situation exists in that the magnetic field is primarily established through metal, rather than through air which would be the case if the magnetic field were established at right angles to that indicated.

Figure 3:
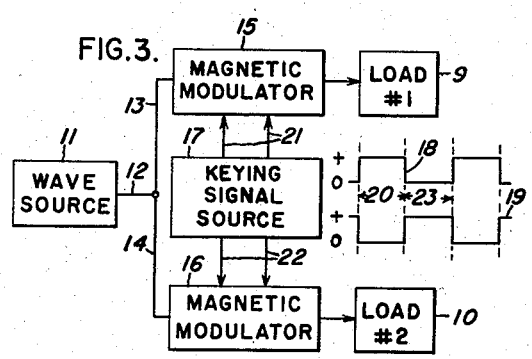
Fig. 3 illustrates in block diagram form an application of the present invention for power distribution to separate load circuits.

Referring to Fig. 3 there is shown an application of the present invention for distributing radio frequency power to two or more load circuits, as for example 9 and 10. In this arrangement electromagnetic waves available from a wave source 11, as for example a magnetron, are applied over waveguide sections 12, 13 and 14 to respective magnetic modulator units 15 and 16. These modulator units may be similar to those shown in Fig. 1 wherein the flux density established in the parallel plates located in the magnetic fields of the modulators is controlled by the signals available from the keying signal source 17. In this arrangement the keying signals available from 17 are shown to be voltage waves 18 and 19. Thus, during the time interval 20, a high magnetic field is established in the magnetic modulator 15 by means of the positive keying pulse applied over the leads 21, thereby substantially reducing the wave attenuation effect of the parallel plates, such that a maximum of wave energy is applied to the load circuit 9. Simultaneously during this time interval 20 no signal is applied to the magnetic modulator 16, such that its attenuation is at a high level and a minimum of wave energy is applied to the load circuit 10. During a subsequent time interval 23 the conditions are reversed and a maximum of wave energy is applied to the load circuit 10 and a minimum of wave energy to the load circuit 9. In a particular embodiment the load circuits may comprise wave radiating elements, such as antennas or horns having a different directivity, such that an effective lobing of the wave radiation pattern is obtained.

Figure 4:
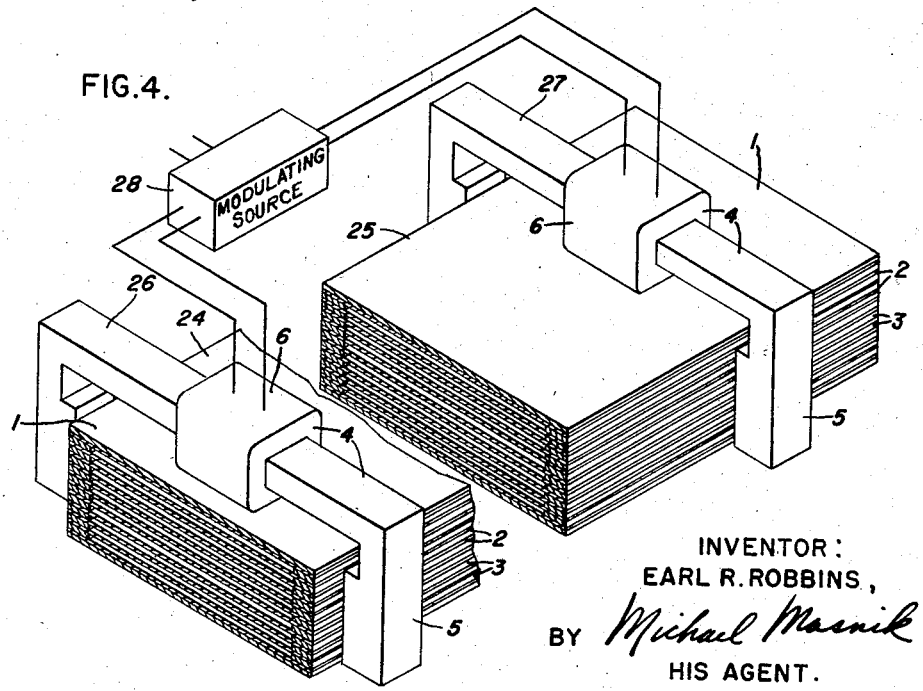
Fig. 4 illustrates in perspective a further embodiment of the present invention particularly useful for high power applications.

It is possible, particularly where high powers of radio frequency waves are involved, that the dissipation of the high temperatures resulting from wave attenuation becomes a problem. To combat this problem, it is possible to employ several magnetic modulators spaced along the length of waveguide as shown in Fig. 4. In Fig. 4 two sections of attenuators are employed as shown at 24 and 25. Associated with each of these sections is an electromagnet 26 and 27, respectively. The magnetic field established by the electromagnets is controlled by signals from a common modulating signal source 28. By effectively spreading the attenuation over a greater length of waveguide, the heating can be minimized to a tolerable factor.

Figure 5A:
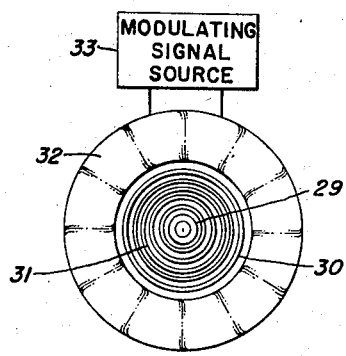
Fig. 5a and Fig. 5b illustrate an application of the present invention to coaxial transmission line.
Figure 5B:
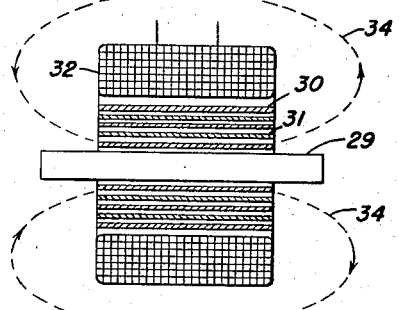

While the previous arrangement was described utilizing waveguides of the rectangular type, it is obvious that other waveguides or wave transmission lines may be employed, as for example the coaxial transmission line, the strip and the sandwich line, etc. Referring to Fig. 5, there is shown an application of the present invention to coaxial type transmission lines. In this embodiment the coaxial transmission line is shown as comprising an inner conductor 29 associated with a hollow outer conductor 30. In the region between the inner and outer conductors there are placed parallel plates of magnetic material concentrically arranged around the center conductor in a manner described in further detail in the previously mentioned copending application. The magnetic field is established by means of the electromagnet 32 which has a cylindrical construction and whose magnetic field intensity is controllable by a signal from the modulating signal source 33. Referring to Fig. 5b, the magnetic field that is established is shown by the magnetic lines 34.

Figure 6A:
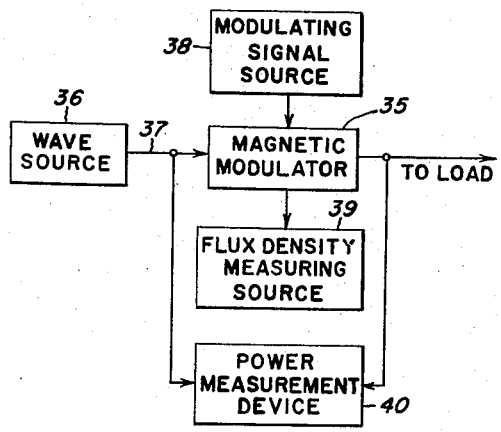
Fig. 6a illustrates an application of the present invention for measurement purposes.

Referring now to Fig. 6, there is shown an embodiment of the present invention for measuring certain characteristics of the material forming the parallel plates employed in the attenuator section of the waveguide. In a particular application it is desired to measure the permeability of the material forming the parallel plates that are employed in the attenuator section of the magnetic modulator 35. Referring to the formula for attenuation previously discussed, it can be shown that for the arrangement of Fig. 6a, the surface resistance of the plate material is given by the following formula:

$$R_s = \frac{1}{\sigma\delta} = \sqrt{\rho\pi f\mu}$$

$R_s$—surface resistance—ohms
$\sigma$—conductivity—mhos/meter
$\delta$—skin depth—meters
$f$—frequency—cycles per second
$\mu$—magnetic permeability—gausses
$\rho$—resistivity—ohms The attenuation is then given by the following formula:

$$\alpha_c = \sqrt{\mu K}$$

Figure 6B:
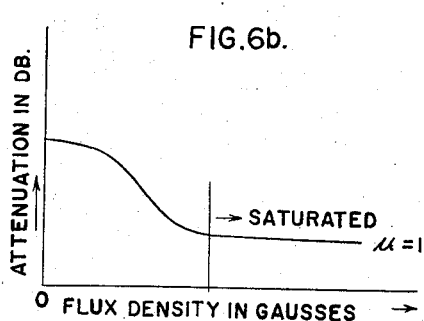

$\alpha_c$—attenuation due to conduction losses in $\frac{nepers}{meter}$ $\mu$—magnetic permeability in gausses
$K$—constant The permeability of the plate material at a particular frequency can be derived in the following manner. Referring to Fig. 6a, electromagnetic waves of a particular frequency, for example 3,000 megacycles per second, are supplied over a transmission line 37 to the magnetic modulator 35 and thence to the load circuit now shown. The waves passing through the magnetic modulator are attenuated under the control of a modulating signal available from source 38 as previously described. Devices 39 and 40 are employed to measure the flux density established in the parallel plates, and the attenuation in intensity of the electromagnetic waves being propagated through the modulator 35. For a given frequency by varying the modulating signal available from source 38 readings can be taken and a graph plotted as shown in Fig. 6b wherein the flux density in gausses is plotted as abscissa, and the wave attenuation in decibels is plotted as the ordinate.

The flux density may be determined by any of several measuring devices available in the art. One such device employs a probe and a balanced bridge circuit for measuring the flux density. The power measurement device 40 may comprise probes or directional couplers permitting the power level at the input and output sides of the magnetic modulator 35 to be compared. Employing the information available from the graph of Fig. 6b and the previous formula, it can be shown that the permeability at any given magnetic field flux density and wave frequency is given by the following formula:

$$\mu_1 = \frac{\alpha_1^2}{\alpha_2^2}\mu_2$$

$\mu_1, \mu_2$—magnetic permeability in gausses
$\alpha_1, \alpha_2$—attenuation due to conduction losses in nepers/meter Thus, if we substitute into this formula the attenuation in decibels corresponding to a permeability of 1, that is with the material in its saturated magnetic state, the permeability at a different flux density can readily be computed. If the wave source 36 is made variable in frequency, it is seen that by a relatively simple measurement arrangement, considerable information can be derived with respect to the characteristics of the materials employed as the parallel plates of the attenuator section of the waveguide.

While specific embodiments of the invention have been shown and described, it will, of course, be understood that various modifications may yet be derived by those skilled in the art which will embody the principles of the invention and found in the true spirit and scope thereof.

What I claim and desire to secure by Letters Patent of the United States is:

1. In combination, a waveguide for propagating electromagnetic waves, said waveguide comprising a plurality of separate attenuator portions, each of said attenuator portions comprising a plurality of electrically conductive plates supported within said waveguide in spaced apart relation and having a component of their planes perpendicular to the electric field established by the waves to be propagated in said waveguide, means for establishing a magnetic field within each of said attenuator portions, said plates comprising material having a permeability greater than 1 and whose permeability changes with a change in said established applied magnetic field, and means for modulating said magnetic fields to correspondingly attenuate the waves passing through said attenuator portions.

2. In combination, a waveguide for propagating electromagnetic waves, said waveguide comprising a plurality of wave controlling portions, each of said portions comprising a plurality of electrically conductive plates supported within said waveguide in spaced apart relation and having a component of their planes perpendicular to the electric field established by the waves to be propagated in said waveguide, means for establishing a magnetic field within each of said portions, said plates comprising material whose permeability changes with a change in said established magnetic field, and means for modulating said magnetic fields to vary the intensity of the waves passing through said portions.

3. An arrangement for measuring the permeability of a material at a given wave frequency and a given flux density comprising a waveguide, means for propagating waves within said waveguide at said given frequency, a plurality of electrically conductive plates comprising said material supported within a portion of said waveguide in spaced apart relation and having a component of their planes perpendicular to the electric field established by the waves to be propagated in said waveguide, means for establishing a magnetic field within said waveguide, means for varying the magnetic field to correspondingly vary the attenuation of waves being propagated between said plates, means for measuring the flux density established within said portion of waveguide, and means for measuring the attenuation of the waves propagated through said portion of waveguide.

4. The method of measuring the permeability of a material at a given wave frequency and a given flux density comprising guiding said wave at a given frequency past a plurality of spaced apart electrically conductive plates formed of said material and having their planes perpendicular to said guided wave, establishing a magnetic field between said plates varying said magnetic field, measuring the resultant flux density, measuring the attenuation of said guided wave and comparing said measured flux density and attenuation to obtain the value of permeability of said material.

References Cited in the file of this patent
UNITED STATES PATENTS

| | | |
|---|---|---|
| 2,511,610 | Wheeler | June 13, 1950 |
| 2,784,378 | Yager | Mar. 5, 1957 |